United States Patent
van den Brink et al.

(10) Patent No.: US 10,705,310 B2
(45) Date of Patent: Jul. 7, 2020

(54) AUTOMOTIVE VISION SYSTEM

(71) Applicant: Orlaco Products B.V., Barneveld (NL)

(72) Inventors: Alfred van den Brink, Barneveld (NL); Josja Kneefel, Apeldoorn (NL)

(73) Assignee: Orlaco Products B.V., Barneveld (NL)

( * ) Notice: Subject to any disclaimer, the term of this patent is extended or adjusted under 35 U.S.C. 154(b) by 106 days.

(21) Appl. No.: 15/849,709

(22) Filed: Dec. 21, 2017

(65) Prior Publication Data

US 2018/0180833 A1   Jun. 28, 2018

(30) Foreign Application Priority Data

Dec. 28, 2016 (EP) .................................. 16207165

(51) Int. Cl.
| | | |
|---|---|---|
| *G02B 7/06* | (2006.01) | |
| *G02B 7/00* | (2006.01) | |
| *G02B 5/20* | (2006.01) | |
| *B60R 11/04* | (2006.01) | |
| *H04N 5/225* | (2006.01) | |
| *G02B 26/00* | (2006.01) | |
| *G03B 11/00* | (2006.01) | |

(52) U.S. Cl.
CPC .............. *G02B 7/006* (2013.01); *B60R 11/04* (2013.01); *G02B 5/208* (2013.01); *G02B 26/008* (2013.01); *G03B 11/00* (2013.01); *H04N 5/2254* (2013.01); *B60Y 2304/076* (2013.01); *G03B 2205/0053* (2013.01)

(58) Field of Classification Search
CPC ...... G02B 7/006; G02B 26/008; G02B 5/208; G03B 11/00; G03B 2205/0053; H04N 5/2254; B60R 11/04; B60Y 2304/076
See application file for complete search history.

(56) References Cited

U.S. PATENT DOCUMENTS

| | | |
|---|---|---|
| 2006/0250702 A1 | 11/2006 | Nishimoto |
| 2006/0274285 A1 | 12/2006 | Pao |
| 2011/0036982 A1 | 2/2011 | Chiang |
| 2012/0008930 A1 | 1/2012 | Barley et al. |
| 2015/0042818 A1* | 2/2015 | Wada ..................... G03B 17/14 348/164 |

FOREIGN PATENT DOCUMENTS

| | | |
|---|---|---|
| CN | 202995217 U2 | 6/2013 |
| JP | 2013109008 A | 6/2013 |
| JP | 2013254014 A | 12/2013 |

* cited by examiner

*Primary Examiner* — Tony Ko
(74) *Attorney, Agent, or Firm* — N.V. Nederlandsch Octrooibureau; Catherine A. Shultz; Katelyn J. Bernier

(57) ABSTRACT

The present invention relates to an automotive vision system, in particular for providing rear and/or side view, comprising;
    an image capturing device, and
    an optical filter device included in an optical path to the image capturing device, wherein the optical filter device comprises an optical filter medium that is moveable by a driving device with respect to the optical path in order to adjust filter characteristics,
wherein the driving device comprises a cam transmission that imposes a reciprocating movement on the optical filter medium over an adjustment range between two extreme positions and wherein the cam transmission has a stop arrangement defining an operative position of the optical filter medium with respect to the optical path, wherein the operative position is within the adjustment range and the operative position is in the vicinity of any of the two extreme position.

Figure 1:
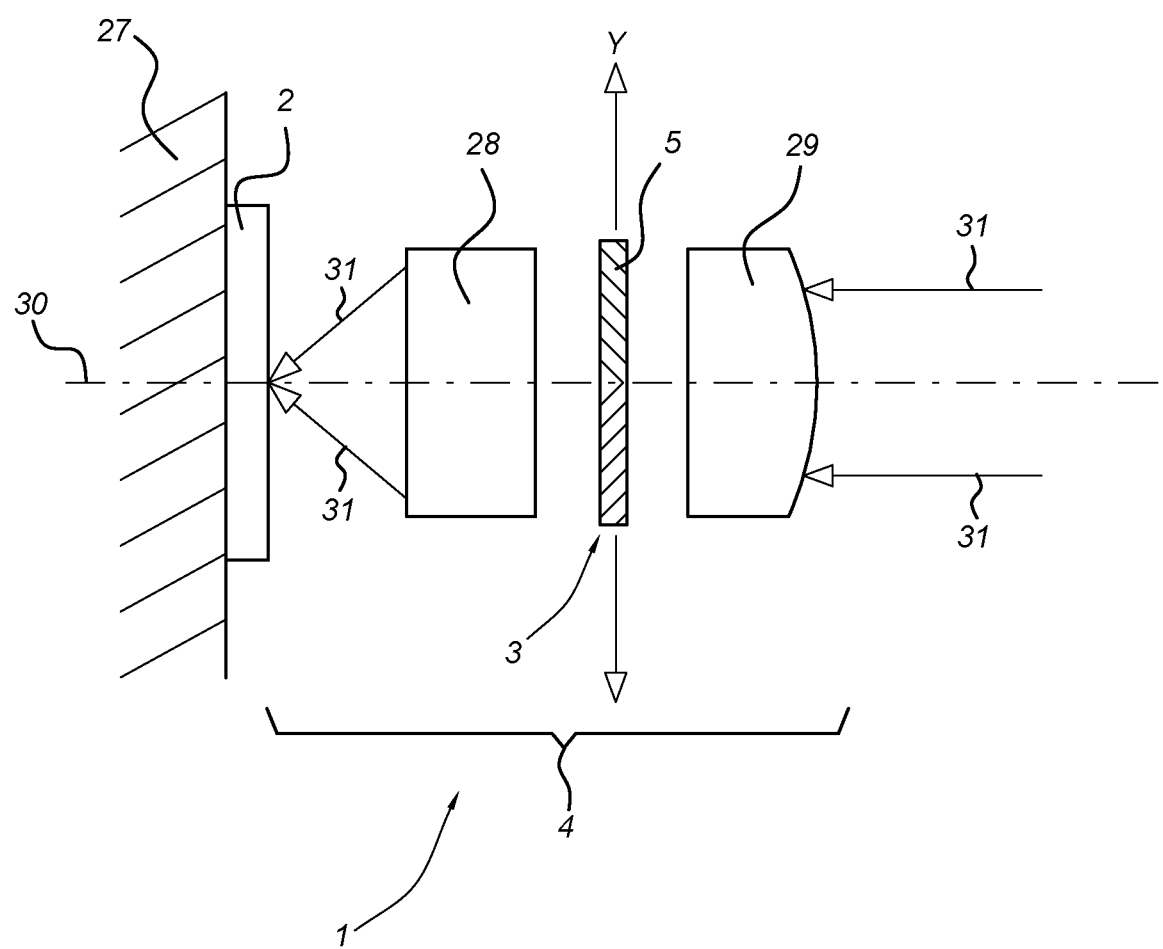

18 Claims, 3 Drawing Sheets

AUTOMOTIVE VISION SYSTEM

FIELD OF THE INVENTION

The present invention relates to an automotive vision system, comprising;
an image capturing device,
an optical filter device included in an optical path to the image capturing device, wherein the optical filter device comprises an optical filter medium that is moveable by a driving device with respect to the optical path in order to adjust filter characteristics.

BACKGROUND ART

An imaging system for a vehicle is known from U.S. Pat. No. 7,965,336 B2.

Known automotive vision systems have the problem that the filter medium is not moveable under all circumstances, in particular the filter medium may clamp against an end stop, in particular when the driving device is self-braking. Another problem is that the filter medium may accidentally lose its designed position because of sudden shocks. This is in particular the problem with electromagnetic solenoid type of actuators.

SUMMARY OF THE INVENTION

The present invention seeks to provide an automotive vision system that has robust control of its optical filter characteristics.

The present invention therefore provides an automotive vision system, in particular for providing rear and/or side view, comprising;
an image capturing device, and
an optical filter device included in an optical path to the image capturing device, wherein the optical filter device comprises an optical filter medium that is moveable by a driving device with respect to the optical path in order to adjust filter characteristics,
wherein the driving device comprises a transmission for converting rotational drive motion into linear reciprocating drive motion of the optical filter medium, wherein the transmission imposes a reciprocating movement on the optical filter medium over an adjustment range between two extreme positions, and wherein the transmission has a stop arrangement defining an operative position of the optical filter medium with respect to the optical path, wherein the operative position is within the adjustment range and the operative position is in the vicinity of any of the two extreme position.

Because the operative position is in the vicinity of any of the two extreme position, it is possible to provide a secure position of the optical filter medium without the need to clamp the optical filter medium against an end stop at one of the extreme positions.

This effect is achieved by setting the operation position in the vicinity of the extreme position also referred to as "turning point" or "dead-point". The reason therefore is that because at the "dead-point" the rotational drive motion is perpendicular to the linear reciprocating drive motion of the optical filter medium, so that the transmission factor is zero. Therefore, from perspective of the optical filter medium the transmission itself hinders the optical filter medium from moving out of the operative position.

In other words, the possibility of a safe window of operation between an extreme position and an operative position is created in connection with the position of the optical filter medium.

In the operative position, the optical filter medium is at a defined position with respect to the optical path. This can be in, like centred, or out the optical path. It is also conceivable that the optical filter medium has a number of filter sections and one of the filter sections is in the optical path when the optical filter medium is in the operative position.

It is also conceivable that the stop arrangement is configured to define two operative positions. An operative in-position wherein the optical filter medium is in the optical path and an operative out-position wherein the optical filter medium is out of the optical path.

It is preferred that the driving device is a not self-braking type of driving device. It is of course conceivable that the driving device is of a self-braking type, however that may introduce self-clamping of the driving device which is unwanted in view of fast response times that are required in automotive vision systems.

In contrast, in the state of the art, the operative position coincides with an extreme position of the optical filter medium which may cause clamping of the optical filter medium or may cause the optical filter medium to lose its operative position.

In an embodiment, the transmission for converting rotational drive motion into linear reciprocating drive motion comprises a cam transmission and/or a crank mechanism. Both a cam transmission and a crank mechanism are known per se. The cam transmission has a cam and cam profile that work together to convert rotational drive motion into linear reciprocating drive motion. The crank mechanism is well known in connection with a piston of a combustion engine. The crank mechanism requires an additional rotation member compared to the cam transmission.

In an embodiment, the operative position is situated past from one of the extreme positions, at at least about 1% of the adjustment range, in particular between about 1% and 10% of the adjustment range. It will be clear that other positions from the extreme positions are conceivable as long as the hinder experienced by the optical filter medium because of the transmission is sufficient. In practice, the about 1% of the adjustment range provides a sufficient safe window of operation. This operative position being situated past from one of the extreme positions, all the more provides a secure position of the optical filter medium without the need to clamp the optical filter medium against an end stop at one of the extreme positions. As explained, at the "dead point" the transmission itself already hinders the optical filter medium from moving out of the operative position. It is even more unlikely for the optical filter medium to move "through" the dead point because that would require a disturbing force that changes direction. "Past" refers to the movement of the optical filter medium that moves to an extreme position and then turns and moves past the extreme position towards the operative position.

In an embodiment of the automotive vision system the drive system comprises hysteresis through the transmission. In general, hysteresis can be defined as a retardation of an effect when the forces acting upon a body are changed. In this case, the effect of unwanted movement of the optical filter medium caused by an external disturbing force on the optical filter medium will be delayed because the optical filter medium cannot take the shortest distance between operative positions, instead the optical filter medium is forced by the transmission to move towards an extreme position first and has to reverse movement of direction at the extreme position. The hysteresis provides a safe operating window in terms of translatory position of the optical filter medium in which the optical filter characteristics are predictable. The safe operating window is defined by the operative position and an extreme position. Firstly, in practice the hysteresis causes that to leave the operative positon, the optical filter medium first has to move beyond the operative position towards the closest extreme position and then move to the other extreme position. This is an unlikely movement pattern under foreseeable disturbing forces because this would also require the disturbing force to change direction. Secondly, the transmission itself hinders the optical filter medium from moving because when the optical filter medium is in an operative position, the cam transmission is in a state just passed a turning point of the optical filter medium. Turning point refers to the reciprocating movement of the optical filter medium over an adjustment range between two extreme positions. The extreme positions are turning points.

The unlikely movement pattern and the hindrance caused by the cam transmission assure a predictable position of the optical filter medium with respect to the optical path.

In an embodiment of the automotive vision system, the transmission is a cam transmission that comprises a cam profile wherein an end of the cam profile comprises a stop surface. This enables to have a more integrated system because the stop arrangement is integrated with the cam transmission. It will be clear that the cam profile may comprise a pair of opposite stop surfaces to define respective first and second operative positions of the optical filter medium.

In an embodiment of the automotive vision system, the cam profile is arranged on an optical filter medium supporting frame. This even more enables to have an integrated system with a lower number of parts.

In an embodiment of the automotive vision system, the cam profile extends rectilinear. In particular, the rectilinear cam profile extends in a direction perpendicular with respect to the reciprocating movement of the optical filter medium.

It is of course conceivable that the cam profile has a different shape like a curved shape.

In an embodiment of the automotive vision system, the cam transmission comprises a rotation member provided with a cam located at a radial distance from a rotation centre of the rotation member.

In an embodiment of the automotive vision system, the cam extends axial with respect to the rotation centre of the rotation member.

In an embodiment of the automotive vision system, the cam located at a radial distance from a rotation centre of the rotation member cooperates with the rectilinear cam profile for converting rotational drive motion of the rotation member into linear drive motion of the filter medium. The cam located at a radial distance from a rotation centre of the rotation member in combination with the cam profile, imposes the reciprocating movement on the optical filter medium.

It will be understood that an inverse kinematic solution is also conceivable, like e.g. a cam profile formed with the rotation member and the cam mounted with the optical filter medium in particular mounted with the optical filter medium frame.

In an embodiment, the automotive vision system comprises a guiding structure for the filter medium supporting frame, and wherein the stop arrangement comprises a stop surface coupled with the guiding structure. Coupling of the stop surface with the guiding structure may even more help to define the operative position of the optical filter medium.

In an embodiment of the automotive vision system, the guiding structure comprises a pair of stop surfaces. The pair of stop surfaces engage with said cam and defining first and second operative positions of the optical filter medium which may be an in—and out of—optical path position. These pair of stop surfaces may be opposite stop surfaces, wherein opposite can be understood both spatially and/or functionally.

The present invention also relates to a vehicle comprising an automotive vision system according to the invention.

The present invention also relates to a method comprising retrofitting an automotive vision system according to the invention with a vehicle.

The present invention also relates to a use of an automotive vision system according to the invention to adjust filter characteristics to night or day conditions.

In an embodiment, the use comprises powering the driving device in order to maintain the optical filter medium in the operative position. The powering can optionally be continuously, or pulsed, like a so called reset pulse. The powering can be at a lower power rate because the purpose is to maintain position, not to set the optical filter medium in motion.

SHORT DESCRIPTION OF DRAWINGS

Figure 2:
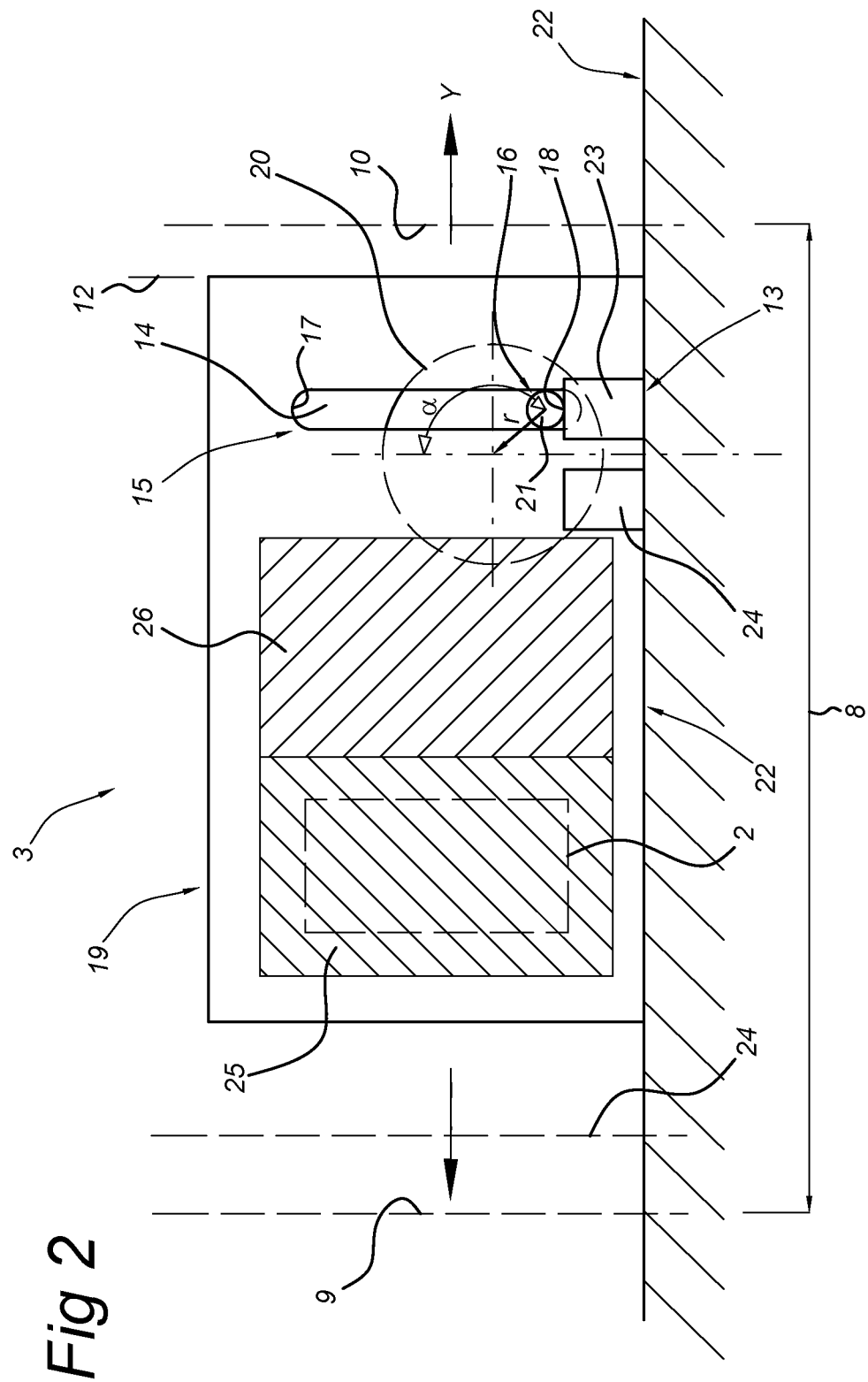

The present invention will be discussed in more detail below, with reference to the attached drawings, in which FIG. 1 is a schematic side view of the automotive vision system according to the invention, FIG. 2 is a front view of a detail of the automotive vision system of FIG. 1

Figure 3:
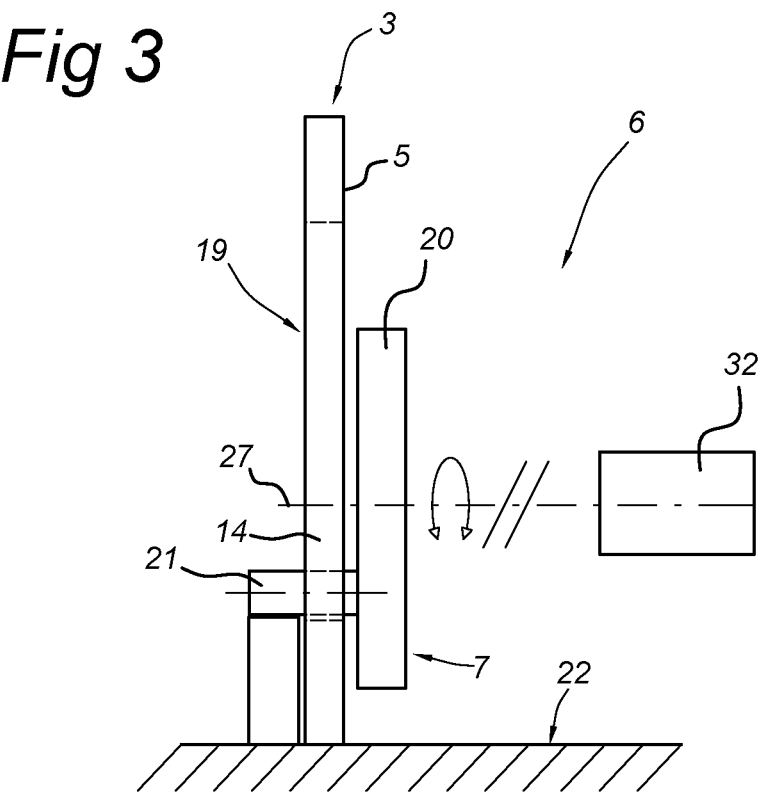
Figure 4:
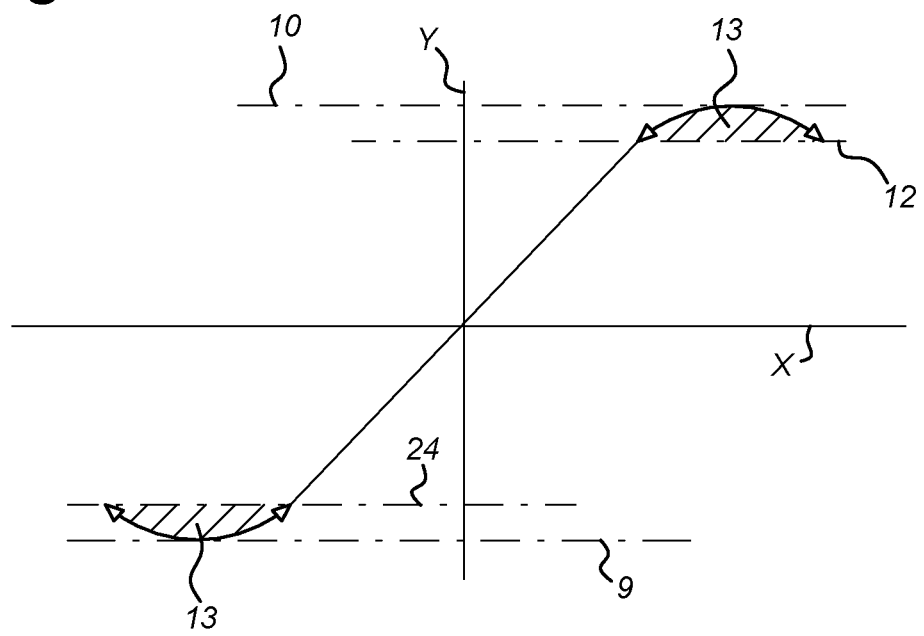

FIG. 3 is a side view of a detail of the automotive vision system of FIG. 1; and FIG. 4 shows the relation between the rotational drive motion α of the rotation member into linear drive motion y of the filter medium.

DESCRIPTION OF EMBODIMENTS

FIG. 1 is a schematic side view of the automotive vision system 1 according to the invention. The automotive vision system 1 comprises an image capturing device 2. The image capturing device 2 is mounted on a support 27.

The automotive vision system 1 comprises an optical filter device 3. The optical filter device 3 is included in an optical path 4 to the image capturing device 2. The optical path is generally denoted by reference number 4. The optical path 4 has its ordinary meaning in that it is the path where light 31, or electromagnetic waves in general, travel through. In the optical path 4, a lens 29 or any other suitable optical element 28 may be accommodated to project the image onto the image capturing device 2. Although, the optical element 28 is here shown as arranged between the optical filter medium 5 and the image capturing device 3, it will be clear that the optical filter medium 5 can be arranged directly next to the image capturing device 3, that is without the optical element 28 arranged between the optical filter medium 5 and the image capturing device 3.

The optical path 4 extends along an optical axis 30 of the automotive vision system 1. The optical filter device 3 comprises an optical filter medium 5. The optical filter medium 5 is moveable by a driving device 6 as best shown in FIG. 3. The optical filter medium 5 is moveable with respect to the optical path 4 in order to adjust filter characteristics of the optical filter device 3. Here, the optical filter medium 5 is moveable along an y-direction transverse with respect to the optical axis 30.

In FIGS. 2 and 3 it is shown that the driving device 6 comprises a cam transmission 7. The cam transmission 7 is powered by a motor, in this case a small electromotor 32 with a diameter of about 4 mm or any other suitable small diameter. The cam transmission 7 imposes a reciprocating movement on the optical filter medium 5 along the y-direction. The cam transmission 7 imposes a movement on the optical filter medium over an adjustment range 8. The adjustment range 8 of the movement of the optical filter medium extends between two extreme positions 9, 10 of the optical filter medium 5. Here, the adjustment range 8 is depicted as the reach of the extremities of the filter medium supporting frame 19 during movement. The movement of the optical filter medium 5 is reciprocating in that it turns at the extreme positions 9, 10 while the driving device 6 does not change its driving direction.

The cam transmission 7 comprises a cam 21 and a cam profile 14 that are operationally connected. Here, the cam profile 14 is arranged on an optical filter medium supporting frame 19.

In this case, the cam profile 14 extends rectilinear. In this case, the cam profile 14 extends in a direction perpendicular with respect to the reciprocating movement of the optical filter medium 5 in the y-direction.

The cam transmission 7 comprises a rotation member 20 having a rotation centre 27. The rotation member 20 is directly coupled with the motor 32 to provide a quick response. The cam 21 is mounted with the rotation member 20. The cam 21 is located at a radial distance from the rotation centre 27. The cam 21 extends axial with respect to the rotation centre 27 of the rotation member 20. The cam 21 seen from the centre of rotation 27 makes an angle α with the vertical, that is vertical as shown in FIG. 2. The cam 21 cooperates with the rectilinear cam profile 14 for converting rotational drive motion of the rotation member 20 into linear drive motion of the optical filter medium 5 or more in general, the optical filter medium supporting frame 19.

A displacement of the cam 21 due to e.g. vibration on account of vehicle motion does not lead to significant linear displacement of the frame 19 because of the hinder through the cam transmission 7. This effect is achieved by setting the operative position 12, 24 in the vicinity of the "dead-point", that is the extreme position 9, 10, of the cam transmission. At that position, the motion of the cam 21 on rotation member 20 is perpendicular to the linear motion of frame 19, so that the transmission factor is zero.

Using the definition of α as given in FIG. 2 and the cam 21 located at a radial distance r from the rotation centre of the rotation member 20. The relation between the linear displacement y and the rotational displacement α along the circumference is expressed as y=r sinα. Now the derivative dy/dα is r cos α, so that the transmission factor is minimum around a α=90°. The stop surface 23 defines an operative position 12 such that the cam 21 is beyond the dead-point when looking from the side of the adjustment range between the extreme points 9 and 10. In other words, using the example of FIG. 2 and from perspective of the transmission 7, the operation position is at α=90°+Δ and not at α=90°−Δ. Similarly, the stop surface 24 defines an operative position at α=−90°−Δ. The Δ is at least about 1% of the adjustment range, in particular between about 1% and 10% of the adjustment range.

The automotive vision system 1 comprises a guiding structure 22 for guiding the filter medium supporting frame while the filter medium supporting frame is moving. Although the guiding structure 22 is only shown as simple plane, the guiding structure 22 constrains the filter medium supporting frame 19 such that the filter medium supporting frame 19 can only translate along the Y-direction.

The cam transmission 7 comprises a stop arrangement 13. The stop arrangement defines an operative position 12 of the optical filter medium 5 with respect to the optical path 4. The operative position 12 is within the adjustment range 8 and the operative position 12 does not coincide with any of the two extreme position 9, 10. Here, the operative position 12 is situated remote from the extreme position 10, at about 1% of the adjustment range 8. In operative position 12 as shown in FIG. 2, section 25 of the optical filter medium 5 is in the optical path 4. In other words, the section 25 overlaps with the image capturing device 2 as seen along the optical axis 30. In operative position 24, the other section 26 of the optical filter medium 5 is in the optical path 4. The different sections 25, 26 of the optical filter medium allow to adjust filter characteristics to night or day conditions. For example infrared radiation can pass section 25 during night conditions and section 26 blocks infrared radiation during day conditions.

Here, the stop arrangement 13 comprises opposite end stops 17, 18 at opposite ends 15, 16 of the cam profile 14. As an alternative or in addition, the stop arrangement 13 comprises first and second stop surfaces 23, 24 coupled with the guiding structure 22.

As an option, the mass distribution of the rotation member 20 can be configured such that the cam 21 has a preference to contact one, or by preference two opposite, of stop surfaces 17, 18, 23, 24, when the centre of rotation 27 extends in the horizontal.

As is shown in FIG. 4, the drive system comprises hysteresis 13 through the cam transmission. The hysteresis is defined by the operative position 12 of the optical filter medium 5 and an extreme position 10. Here, the drive system provides hysteresis 12 for both opposite operative positions 12 and 10. In operative position 12, the optical filter medium 5 is in the optical path 4 or a predetermined section 25, 26 of the optical filter medium 5 is in the optical path 4. In operative position 10, the optical filter medium 5 is out of the optical path 4 or a predetermined section 25, 26 of the optical filter medium 5 is in the optical path 4.

The present invention has been described above with reference to a number of exemplary embodiments as shown in the drawings. Modifications and alternative implementations of some parts or elements are possible, and are included in the scope of protection as defined in the appended claims.

The invention claimed is:

1. An automotive vision system (1), in particular for providing rear and/or side view, comprising;
    an image capturing device (2), and
    an optical filter device (3) included in an optical path (4) to the image capturing device, wherein the optical filter device comprises an optical filter medium (5) that is moveable by a driving device (6) with respect to the optical path in order to adjust filter characteristics,
    wherein the driving device comprises a transmission (7) for converting rotational drive motion into linear reciprocating drive motion of the optical filter medium,
    wherein the transmission (7) imposes a reciprocating movement on the optical filter medium over an adjustment range (8) between two extreme positions (9, 10), and wherein the transmission has a stop arrangement (13) defining an operative position (12) of the optical filter medium with respect to the optical path,
wherein the operative position is within the adjustment range and the operative position is situated past one of the extreme positions and beyond a dead point of the transmission.

2. An automotive vision system according to claim 1, wherein the transmission (7) for converting rotational drive motion into linear reciprocating drive motion comprises a cam transmission and/or a crank mechanism.

3. An automotive vision system according to claim 1, wherein the operative position is situated past one of the extreme positions by at least about 1% of the adjustment range.

4. An automotive vision system according to claim 1, wherein the drive system comprises hysteresis (13) through the transmission.

5. An automotive vision system according to claim 1, wherein the transmission is a cam transmission that comprises a cam profile (14) wherein an end (15, 16) of the cam profile comprises a stop surface (17, 18).

6. An automotive vision system according to claim 1, wherein the cam profile is arranged on an optical filter medium supporting frame (19).

7. An automotive vision system according to claim 1, wherein the cam profile extends rectilinear.

8. An automotive vision system according to claim 1, wherein the rectilinear cam profile extends in a direction perpendicular with respect to the reciprocrating movement of the optical filter medium.

9. An automotive vision system according to claim 5, wherein the cam transmission comprises a rotation member (20) provided with a cam (21) located at a radial distance from a rotation centre of the rotation member (20).

10. An automotive vision system according to claim 9, wherein the cam extends axial with respect to the rotation centre of the rotation member.

11. An automotive vision system according to claim 9, wherein the cam cooperates with the rectilinear cam profile for converting rotational drive motion of the rotation member into translatory drive motion of the optical filter medium.

12. An automotive vision system according to claim 6, comprising a guiding structure (22) for the filter medium supporting frame, and wherein the stop arrangement comprises a stop surface (23) coupled with the guiding structure.

13. An automotive vision system according to claim 12, wherein the guiding structure comprises a pair of stop surfaces (23, 24).

14. Vehicle comprising an automotive vision system according to claim 1.

15. Method comprising retrofitting an automotive vision system according to claim 1 with a vehicle.

16. The automotive vision system according to claim 3, wherein the operative position is situated past one of the extreme positions by between about 1% and 10% of the adjustment range.

17. A method of operating an automotive vision system comprising an image capturing device, and an optical filter device comprising an optical filter medium, the optical filter device included in an optical path to the image capturing device, the method comprising:
moving the optical filter medium with respect to the optical path in order to adjust filter characteristics by imposing a reciprocating movement on the optical filter medium over an adjustment range between two extreme positions using a driving device comprising a transmission for converting rotational drive motion into linear reciprocating drive motion of the optical filter medium, and
stopping the optical filter medium at an operative position past one of the extreme positions and beyond a dead point of the transmission.

18. The method of claim 17, wherein the transmission is a cam transmission that comprises a rectilinear cam profile.

* * * * *